US008604441B2

(12) United States Patent
Mao et al.

(10) Patent No.: US 8,604,441 B2
(45) Date of Patent: Dec. 10, 2013

(54) LAYERED SEMICONDUCTOR NEUTRON DETECTORS

(75) Inventors: Samuel S. Mao, Castro Valley, CA (US); Dale L. Perry, Hercules, CA (US)

(73) Assignee: The Regents of the University of California, Oakland, CA (US)

( * ) Notice: Subject to any disclaimer, the term of this patent is extended or adjusted under 35 U.S.C. 154(b) by 269 days.

(21) Appl. No.: 12/999,909

(22) PCT Filed: Jul. 23, 2009

(86) PCT No.: PCT/US2009/051576
§ 371 (c)(1),
(2), (4) Date: Mar. 28, 2011

(87) PCT Pub. No.: WO2010/011859
PCT Pub. Date: Jan. 28, 2010

(65) Prior Publication Data
US 2011/0163242 A1  Jul. 7, 2011

Related U.S. Application Data

(60) Provisional application No. 61/083,352, filed on Jul. 24, 2008.

(51) Int. Cl.
*G01T 3/00* (2006.01)
(52) U.S. Cl.
USPC .................................. 250/390.01; 250/269.4
(58) Field of Classification Search
USPC ............................................ 250/390, 390.01
See application file for complete search history.

(56) References Cited

U.S. PATENT DOCUMENTS

| | | | | |
|---|---|---|---|---|
| 5,940,460 A * | 8/1999 | Seidel et al. | ................... | 376/153 |
| 5,969,359 A * | 10/1999 | Ruddy et al. | ............. | 250/370.05 |
| 6,236,097 B1 * | 5/2001 | Hassard et al. | ............... | 257/459 |
| 6,771,730 B1 * | 8/2004 | Dowben et al. | ............... | 376/155 |
| 7,274,025 B2 * | 9/2007 | Berdermann et al. | ... | 250/370.01 |
| 7,372,009 B1 * | 5/2008 | Losee et al. | ................... | 250/200 |
| 7,973,286 B2 * | 7/2011 | Clarke et al. | ............. | 250/370.05 |
| 2004/0007671 A1 * | 1/2004 | Sipila et al. | ............. | 250/370.01 |
| 2004/0084626 A1 * | 5/2004 | McGregor | ............... | 250/370.05 |
| 2009/0302231 A1 * | 12/2009 | McGregor et al. | ....... | 250/390.03 |

FOREIGN PATENT DOCUMENTS

WO    WO 2007109535 A2 *  9/2007

OTHER PUBLICATIONS

Mao, Samuel S., "Nanolasers: Lasing from nanoscale quantum wires", Int. J. of Nanotechnology, vol. 1, Nos. 1 / 2, 2004, pp. 42-85.

* cited by examiner

*Primary Examiner* — David Porta
*Assistant Examiner* — Taeho Jo
(74) *Attorney, Agent, or Firm* — Weaver Austin Villeneuve & Sampson, LLP

(57) ABSTRACT

Room temperature operating solid state hand held neutron detectors integrate one or more relatively thin layers of a high neutron interaction cross-section element or materials with semiconductor detectors. The high neutron interaction cross-section element (e.g., Gd, B or Li) or materials comprising at least one high neutron interaction cross-section element can be in the form of unstructured layers or micro- or nano-structured arrays. Such architecture provides high efficiency neutron detector devices by capturing substantially more carriers produced from high energy α-particles or γ-photons generated by neutron interaction.

20 Claims, 5 Drawing Sheets

LAYERED SEMICONDUCTOR NEUTRON DETECTORS

CROSS-REFERENCE TO RELATED APPLICATIONS

This application claims priority to U.S. Provisional Patent Application No. 61/083,352, titled LAYERED SEMICONDUCTOR NEUTRON DETECTORS, filed Jul. 24, 2008, the disclosure of which is incorporated herein by reference in its entirety and for all purposes.

STATEMENT OF GOVERNMENTAL SUPPORT

The invention described and claimed herein was made at least in part utilizing funds supplied by the U.S. Department of Energy under Contract No. DE-AC02-05CH11231. The Government has certain rights in this invention.

BACKGROUND OF THE INVENTION

Semiconductor detectors are among the most widely used radiation detection devices. They have found applications ranging from space physics to medicine, to defense and homeland security. Semiconductor radiation detectors generally operate by absorbing a quantum of gamma-ray or a neutron and converting the radiation energy into a number of electron-hole pairs that is proportional to the absorbed energy. After the conversion, the motion of the electrons and holes induce electrical signals on detector electrodes. Semiconductor detectors have a number of advantages over other types of particle detectors. For instance, the energy needed to produce an electron-hole pair is only about one-tenth that needed to produce ionization in a gas (e.g., in a Geiger counter). Also, since semiconductors are much denser than a gas, these devices can be made much smaller than a Geiger counter or a cloud chamber.

For semiconductor gamma-ray detectors, the energy resolution is typically one to two orders of magnitude better than gas detectors and scintillators. Most commonly, gamma-ray detectors use germanium (Ge) and cadmium telluride (CdTe)/cadmium zinc telluride (CdZnTe) as the detector material. The interaction of gamma-rays in these semiconductor materials creates electron-hole pairs, the number of which depends on the energy of the incident radiation. The energy information can therefore be extracted by collecting the electron-hole pairs with the application of an external electric field. Semiconductor materials suitable for gamma-ray detection should have high atomic number (Z) for efficient radiation-atomic interactions, a large enough band-gap with high resistivity to maintain low noise associated with leakage current, high crystalline quality with low probability for recombination and trapping, and high carrier mobility for both electrons and holes.

The use of germanium (Ge) crystals cooled to liquid nitrogen temperatures appears to be at present the only choice for optimum performance with respect to efficiency and energy resolution. A major drawback, due to the small band gap of germanium, is that Ge-based gamma-ray detectors have to be operated at low temperature. On the other hand, the moderate need for cooling of CdZnTe (CZT) detectors stems from the fact that the band gap of CZT is significantly larger than that of Ge, which gives a smaller leakage current and hence can be operated at room temperature. $Cd_{1-x}Zn_xTe$ has a direct energy gap for all alloy compositions and is tunable from 1.5 to 2.3 eV at room temperature, for x=0 to 1 respectively. However, the problem with most high-Z semiconductors is the high probability of charge trapping which, depending on the position of the interaction between the electrodes, leads to incomplete charge collection.

For Ge, the density of trapping centers is extremely low and only a negligible fraction of free charges is trapped. The relatively small hole effective mass results in an uncommonly high hole mobility. As a result, the combination of low defect density and long carrier lifetime is responsible for the exceptionally good performance of Ge detectors (at low temperature). CZT on the other hand has a much higher density of trapping centers due to defects. Since the mobility of the holes in CZT is low, the transit time they need to reach the cathode is significant compared to the hole lifetime. Hence the number of free holes is seriously reduced as they drift across the detector. The effect of trapping is therefore a reduction in the amplitude of the output signal that is strongly dependent on the depth of the interaction site. In the output spectrum this gives rise to serious spectral distortion. Although there are a number of techniques developed to correct or compensate for this trapping effect, the performance of CZT detectors has not yet reached the level of which it is theoretically capable due to material quality and is still far from that of Ge detectors.

Solid-state semiconductor neutron detectors offer the advantages of low-power operation and compactness as compared to gas-filled or scintillation neutron detectors. However, neutrons only interact weakly with most known semiconductor detector materials. Neutron detectors function by converting the non-ionizing neutrons into more easily measured charged particles. This is typically accomplished by employing a high neutron cross-section converter material (e.g., $^6Li$, $^{10}B$, or $^{157}Gd$) that yields energetically charged particles upon capturing a neutron. Three very common neutron interactions that are used for a variety of neutron detectors are the $^6Li(n, \alpha)^3H$ reaction, $^{10}B(n, \alpha)^7Li$ reaction, and the $^{157}Gd(n, \gamma)^{158}Gd$ reaction. The energetically charged particles created then produce free carriers in the detector. The free carriers move in response to an applied electric field, producing a current that serves as the measure that a neutron interaction has occurred. However, unlike gamma-ray detection where semiconductor detectors based on Ge and CdZnTe are available, no comparable semiconductor neutron detector materials have been developed.

To fabricate detectors having good charge collecting efficiency and the ability to stop a large fraction of incident photons, high purity, homogeneous, defect-free material is required. For gamma-ray detectors, unlike silicon or gallium arsenide, it is very difficult to grow large size single crystals of CZT, which have been made traditionally from crystals that are grown by a high pressure method. In high pressure growth, crystals grow from a melt (at high temperature, greater than 1100° C.) of nearly equal quantities of cadmium and tellurium, with small cadmium excess, which generates a high vapor pressure. While the high pressure method yields quality detectors, the crystal uniformity is limited and the detector yield is low. Other than a few variations of the high pressure crystal growth method, there have been no reports of effective alternatives to grow high quality crystalline semiconductor materials for radiation detectors.

Incomplete charge collection, due to poor charge transport properties of the detector materials, degrades the energy resolution and lowers the effective photo peak efficiency for gamma-rays as well as for neutrons. Using CdTe as an example, the life time, ($\tau$) and mobility ($\mu$) of the electrons and holes that determine the detector's charge collection efficiency and affect detector's performance have been reported to be $\tau_e=3$ μs, $\tau_h=2$ μs, $\mu_e=1100$ cm$^2$/Vs, and $\mu_h=100$ cm$^2$/Vs, respectively. The relatively low hole mobility and life time cause hole trapping and consequent loss in signal. The amount of charge loss in a single particle detection event, and hence the signal strength, depends on the interaction depth of energy absorption. In energy sensitive measurements this gives rise to an asymmetric broadening of the spectral peaks toward the low energy direction.

Charge collection efficiency can in principle be improved by increasing the electric field strength in the detector crystal (according to the Hecht equation that describes induced charge signal at the anode electrode of standard planar radiation detectors). However, as long as the detector electrodes form ohmic contacts with the CdTe crystal, the detector leakage current is directly proportional to the electric field. The leakage current shot noise eventually becomes the dominant noise source and prohibits higher electric fields. Meanwhile, CdZnTe was developed to reach higher resistivity and lower leakage current than are possible with CdTe. Varying the Zn concentration, the band-gap can be stretched and the resistivity increased (to $10^{11}$ $\Omega$cm). However, CdZnTe has the drawback of lower hole life time ($\tau_e$=5 µs, $\tau_h$=200 ns, $\mu_e$=1350 cm$^2$/Vs and $\mu_h$=120 cm$^2$/Vs). In this case, AlSb as well as GaAs have higher hole mobilities. However, its carrier lifetime is far from what needed to achieve good energy resolution.

There have been significant efforts to develop detector techniques based on the concept of single polarity charge-sensing in order to maintain good energy resolution. In the meantime, CdTe detectors with Schottky type rectifying metal contacts have been introduced. Reverse biasing a Schottky type CdTe detector reduces the leakage current and the detector can operate at higher electric fields. While these improvements have been able to increase the energy resolution to certain extent, there remains a clear need to develop a new paradigm in order to further improve the performance of radiation detectors by orders of magnitude.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY OF THE INVENTION

Figure 1A:
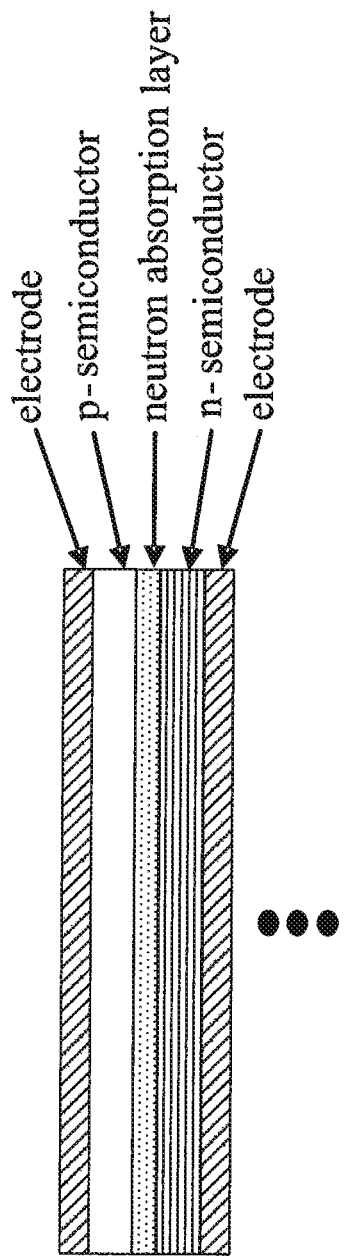
FIG. 1A shows a basic schematic of a stacked diode detector structure in accordance with embodiments of the invention.

Embodiments of the present invention provide room temperature operating solid state hand held neutron detectors. Detectors in accordance with the present invention integrate one or more relatively thin layers or micro- or nano-structure arrays incorporating a high neutron interaction cross-section element with semiconductor detectors. The high neutron interaction cross-section element (e.g., Gd, B or Li) incorporating layer(s) or array(s) can be elemental, alloys, organics, or doped semiconductors and can be in the form of unstructured layers or micro- or nano-structured arrays. Such architecture provides high efficiency neutron detector devices by capturing substantially more carriers produced from high energy particles generated by neutron interaction, and are not limited by the asymmetry of semiconductor materials' mobility-lifetime products for electrons and holes.

These and other aspects of embodiments of the present invention are described in more detail in the description that follows.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail so as to not unnecessarily obscure the present invention.

Introduction

The invention relates to a new apparatus and techniques to improve radiation detection efficiency, especially for neutron detection. In various embodiments, the invention provides semiconductor radiation detectors, such as p-n junction or Schottky junction types, with one or multiple layers of high neutron interaction cross-section element (e.g., Gd, B or Li) incorporating layer(s) or array(s) that can be elemental, alloys, organics or doped semiconductors and can be in the form of unstructured layers or micro- or nano-structured arrays, or micro- or nano-structures comprising at least one high neutron interaction cross-section element. The invention enables the realization of high efficiency neutron detector devices by capturing substantially more carriers produced from high energy particles resulting from neutron interaction, and is not limited by asymmetry of semiconductor materials' mobility-lifetime products for electrons and holes.

The invention provides various embodiments of layered detector architecture for neutron detection. At least one, and possibly multiple, layers of high neutron interaction cross-section materials, including materials comprising at least one high neutron interaction cross-section element, are disposed between semiconductor detectors that have a thickness on the order of the length scale imposed by the product of the semiconductor material's mobility-lifetime-field. The high energy particles such as α particles or γ photons produced in the semiconductor neutron absorption layer(s) escape the layer(s) because of its small thickness, and are detected in the semiconductor detector layers. In this way, using this sandwiched structure, the difficulty of doping the large semiconductor crystals with incompatible materials is avoided.

The semiconductor neutron absorption layer(s) can be in the form of unstructured layers or micro- or nano-structured arrays.

The architecture can be manufactured using well established semiconductor fabrication techniques readily adaptable to the purpose by those of skill in the art given the disclosure provided herein.

In any of the implementations, incoming neutrons generate high energy particles which interact with the semiconductor to generate electron and hole pairs. The electrons move through a circuit connecting the electrodes to fill the holes, thereby signaling neutron detection. The current generated is proportional to the neutrons detected.

Embodiments of the present invention provide room temperature operating solid state hand held neutron detectors.

Neutron Detector Architecture and Fabrication

According to embodiments of the invention a layered detector architecture for neutron detection has least one, and possibly multiple, layers of high neutron interaction cross-section materials, including materials comprising at least one high neutron interaction cross-section element, are disposed between semiconductor detector layers. Suitable thicknesses for the neutron absorption layer(s) are 50 nm to 10 µm; for example 1 µm. The semiconductor detector layers have a thickness on the order of the length scale imposed by the product of the semiconductor material's mobility-lifetime-field (e.g., about 5 to 500 µm; for example about 50 µm). The α particles or γ photons produced in the semiconductor neutron absorption layer(s) escape the layer(s), and are detected in the semiconductor detector layers. In this way, using this sandwiched structure, the difficulty of doping the large semiconductor crystals with incompatible materials is avoided.

A basic schematic of this stacked diode detector structure is shown in FIG. 1A. By this architecture, neutrons are captured by the neutron absorption layer or layers, and the electrons and holes produced from the secondary high energy particles generated from neutron interaction are captured by the semiconductor detector layers.

This architecture overcomes the challenge of incomplete charge collection due to asymmetric carrier transport properties. Stacked multi-layer diode devices of this design can achieve sufficient detection volume, with each thin layer being capable of complete charge collection.

As depicted in FIG. 1A, the semiconductor neutron absorption layer(s) can be in the form of an unstructured layer of a suitable solid-state neutron absorption material. A suitable material has a large neutron interaction cross-section. Examples are Gd, B or Li, alloys thereof (e.g., e.g., LiF and BN), organics containing them, or semiconductors doped with Gd, B or Li. Gd is particularly preferred in many embodiments because it has a large atomic weight and thus can interact with high energy photons in the case of detecting γ-rays resulting from neutron interactions. To determine the thickness of the neutron interacting layer(s), one needs to consider the average range for a high energy particle generated as a result of neutron interaction with the layer material. Beyond the average range, the charged particle can no longer be reliably detected. For example, the range of a 1.47 MeV α-particle in $^{10}$B is 3.6 µm. In order to have certain energy resolution, a B layer should have a thickness of approximately 1 µm. Other suitable Gd, B or Li containing materials may include many organic compounds that can also act as the neutron interaction layers because of the scattering between neutrons and hydrogen.

Figure 1B:
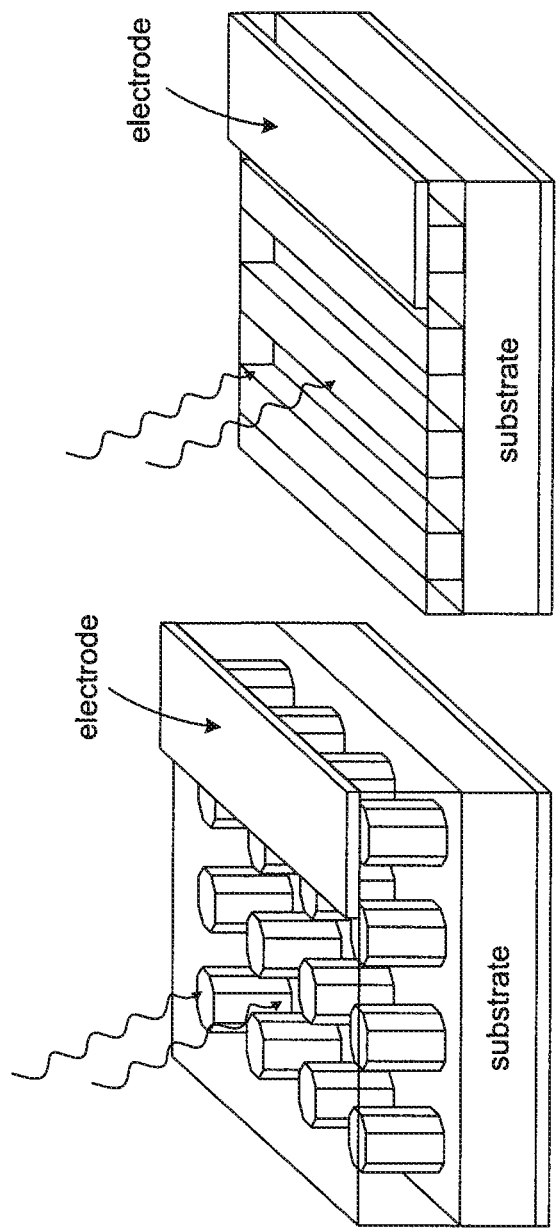
FIG. 1B schematically depicts a semiconductor neutron absorption layer(s) in the form of micro- or nano-structured arrays in accordance with embodiments of the invention.

Alternatively, as schematically depicted in FIG. 1B, and described in greater detail below, at least a portion of the semiconductor neutron absorption layer(s) can be in the form of micro- or nano-structured arrays.

FIG. 1B is a schematic of two heterostructures that embody concepts for radiation detectors (particularly neutron detectors) based on single crystalline semiconductor heterostructures grown via micro- or nano-heteroepitaxy in accordance with embodiments of the present invention. Shown are two types of crystalline semiconductor array structures that can form the core of radiation detector in accordance with the present invention. For example, the substrate (shown disposed on a first electrode) can be a p-type semiconductor, while the column (left) or block (right) crystals (grown through micro- or nano-heteroepitaxy using an appropriate doped precursor (e.g., Gd or B or Li)) can be an n-type semiconductor doped with a high neutron interaction cross-section element (e.g., Gd, B or Li) that form p-n junctions with the substrate. This provides an array of semiconductor material columns that are effective neutron absorption layers. The gaps between the columns allow for the release of the lattice mismatch strain and can be filled with dielectric material (e.g., SOG) to provide structural stability and electrical insulation between active array elements. A second semiconductor layer of opposite dopant type from the substrate (e.g., n-doped) can then be formed (e.g., by deposition) over the array by standard deposition techniques. Then the second electrode (a portion of which is shown for clarity) can be applied.

The use of micro- or nano-heteroepitaxy overcomes the challenge of growing high quality, defect-free semiconductor crystals for radiation detectors. At the same time, as noted above with regard to the unstructured neutron absorption layer embodiment depicted in FIG. 1A, a stacked multi-layer detector architecture overcomes the challenge of incomplete charge collection resulting from the asymmetry of transport in the semiconductor. Radiation detectors implemented with these solid-state architectures could achieve higher energy resolution and sensitivity when compared to the best room temperature detectors available today.

For any of these forms, the architecture can be manufactured using well established semiconductor fabrication techniques readily adaptable to the purpose by those of skill in the art given the disclosure provided herein.

For unstructured embodiments, the various layers may be deposited by various CVD (e.g., evaporation) or PVD (e.g., sputtering) techniques as appropriate for the given material.

The composition of the other layers of the architecture can be as follows: for the electrodes, conventional metallic electrode materials, such as Cu or Cr may be used. For the semiconductor detector layers, n- or p-doped Si or Ge or GaAs may be used.

Additional structural and fabrication details for the micro- or nano-structured implementations of the invention are described in more detail below:

Micro- and Nano-Heteroepitaxy of Crystalline Nanostructures

Figure 2:
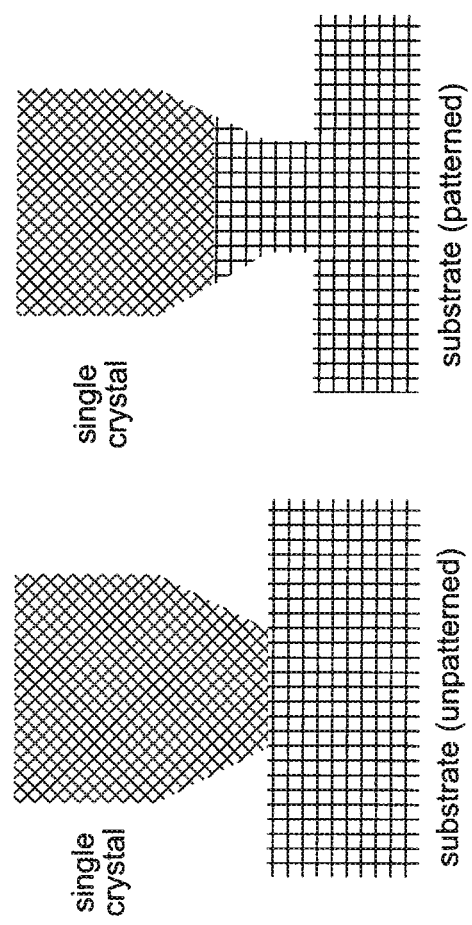
FIG. 2 shows a schematic illustration of two examples of nanoscale crystalline heterostructures grown by nanoscale heteroepitaxy (nano-heteroepitaxy) in accordance with embodiments of the invention, one with and one without a patterned substrate.

FIG. 2 below shows a schematic illustration of two examples of nanoscale crystalline heterostructures grown by nanoscale heteroepitaxy (nano-heteroepitaxy), one with and one without a patterned substrate. Nano-heteroepitaxy is a technique for dramatically extending the thickness of defect-free crystal growth in highly mismatched heterostructures. It exploits the three-dimensional stress relief mechanism at the nanometer (i.e., about 5 to <1000 nm, particularly about 50-500 nm, e.g., about 100 nm feature size) and applies it to reduce the strain energy in lattice-mismatched heterojunctions. The same technique is also applicable in the micrometer scale (i.e., about 1 to 100 µm, e.g., about 5-50 µm feature size) and the description of the nano-heteroepitaxy technique below should be understood to be to the micro scale as well.

When an epilayer grows on a lattice mismatched substrate the strain energy increases linearly until at some point mismatched dislocations are created to reduce strain. Nano-heteroepitaxy is a fundamentally different epitaxial growth approach that utilizes a three-dimensional stress relief mechanism, or the formation of quantum dots and nanorods/columns, to avoid stress relief via mismatched dislocations. It has been found that in this nano-heteroepitaxy growth mode, the strain will fall exponentially with distance from the growth interface.

Nano-heteroepitaxy can be achieved with or without patterning the substrate on which the nano-crystalline semiconductors grow. For example, if the substrate is patterned, nano-heteroepitaxy would combine the three-dimensional stress relief with strain partitioning on the top layers of the substrate. As heteroepitaxy proceeds, the nanoscale epilayer and the nanoscale substrate island both undergo three-dimensional strain. This partitioning of strain between the epilayer and substrate is thus represented by the exponentially decaying strain on both sides of the heterointerface. FIG. 2 shows a schematic illustration of two examples of crystalline heterostructures grown by nano-heteroepitaxy, one with a patterned and one without a patterned substrate.

According to one specific example, an array of neutron absorption features may be made by nanoscale heteroepitaxy as follows: A thin (e.g., about 10-50 nm, for example 20 nm) seed layer of a suitable semiconductor material is grown on a doped (e.g., p-doped) semiconductor (e.g., Si) substrate, for example about 200 μm thick. The seed layer may or may not be doped. The seed layer is then patterned into nano-scale islands (e.g., about 100-5000 $nm^2$, for example 50×50 nm) using standard lithographic techniques. Thereafter, growth of the wide band-gap semiconductor material is continued from the patterned seed layer using an appropriate doped precursor (e.g., Gd or B or Li). This results in the growth an array of single crystal doped wide band-gap semiconductor material columns from the nm scale seed layer islands that are effective neutron absorption layers. The gaps between the columns allow for the release of the lattice mismatch strain and can be filled with dielectric material (e.g., SOG) to provide structural stability and electrical insulation between active array elements. A second semiconductor layer of opposite dopant type (e.g., n-doped) is then deposited over the array by standard deposition techniques, for example to a thickness of 1 μm. Finally, p- and n-contact electrodes are deposited (e.g., by thermal evaporation) onto the p-and n-doped semiconductor layers, respectively.

Alternatively, nanoscale heteroepitaxy without patterning may be conducted by masking the substrate in the non-growth areas during nanorod growth according to well-developed semiconductor processing procedures readily adapted to this application by a person skilled in the art given the disclosure provided herein, or by pre-deposition of self-assembled metallic catalysts (e.g., Au) in the growth area (catalyst-assisted nano-heteroepitaxy), described further below.

Accordingly, nanostructured arrays of single crystalline semiconductor materials (e.g., ZnO and GaN), doped with B or Li or Gd to achieve large neutron interaction cross-section (in addition for gamma-ray detection), on different types of substrate (e.g., Si, GaAs, and ZnTe) can be fabricated in this manner. When the top of the crystal array is deposited with the electrode, each nanoscale crystalline "column" or "rod", as shown in FIG. 1B, essentially forms a sub-micron pixel detector. Following a radiation interaction in such a pixel detector, depending on the design of the device structure, a charge signal is induced by the electrons, or by both the electrons and holes. Pixelated detectors can yield enhanced energy resolution (measured from individual pixels) relative to detectors with one electrode covering the whole detector surface. This phenomenon is called the small pixel effect and is due to the fact that single pixels sense signal charge only close to the pixel electrode. Usually higher detector efficiency is achieved for thinner radiation detectors with small pixel sizes. The deteriorating effect of the slowly moving and trapped holes which are distributed away from the anode contacts is shared between many pixels and becomes less significant on single pixels. This effect is even less significant due to the small thickness of individual layers of arrays of nanoscale crystalline heterostructures grown based on nano-heteroepitaxy.

Stacked Multiple Layer Detector Structures

For gamma-ray and neutron detection, adequate detection efficiency requires a thickness of the detector volume to be at least 1 mm. Good energy resolution and peak detection efficiency is difficult to achieve directly with a thick detector due to the asymmetry of semiconductor transport properties. The stacked radiation detector architecture of the present invention, with each layer comprising an unstructured semiconductor neutron absorption layer or an array of nanoscale crystalline semiconductor neutron absorption layer heterostructures grown by nano-heteroepitaxy, addresses this problem.

The mean drift path of the charge carrier is expressed as the product of μτ and E, where μ and τ are the mobility and lifetime of the charge carrier respectively, and E is the applied electric field in the device. As an example, for γ-ray detection, due to the small μτ of holes for CdTe and CdZnTe, the thickness of the detector should be smaller than $\mu_h \tau_h E$ in order to achieve complete charge collection. Therefore, by using a thin CdTe device, we can overcome the inefficient collection of charge problem caused by the low mobility and short lifetime of holes. Since a CdTe detector with a thickness of more than 1 mm is needed for adequate detection efficiency for γ-rays of hundreds of keV or higher, the stacked detector architecture enables a detector with both high energy resolution and high detector efficiency.

Figure 3:
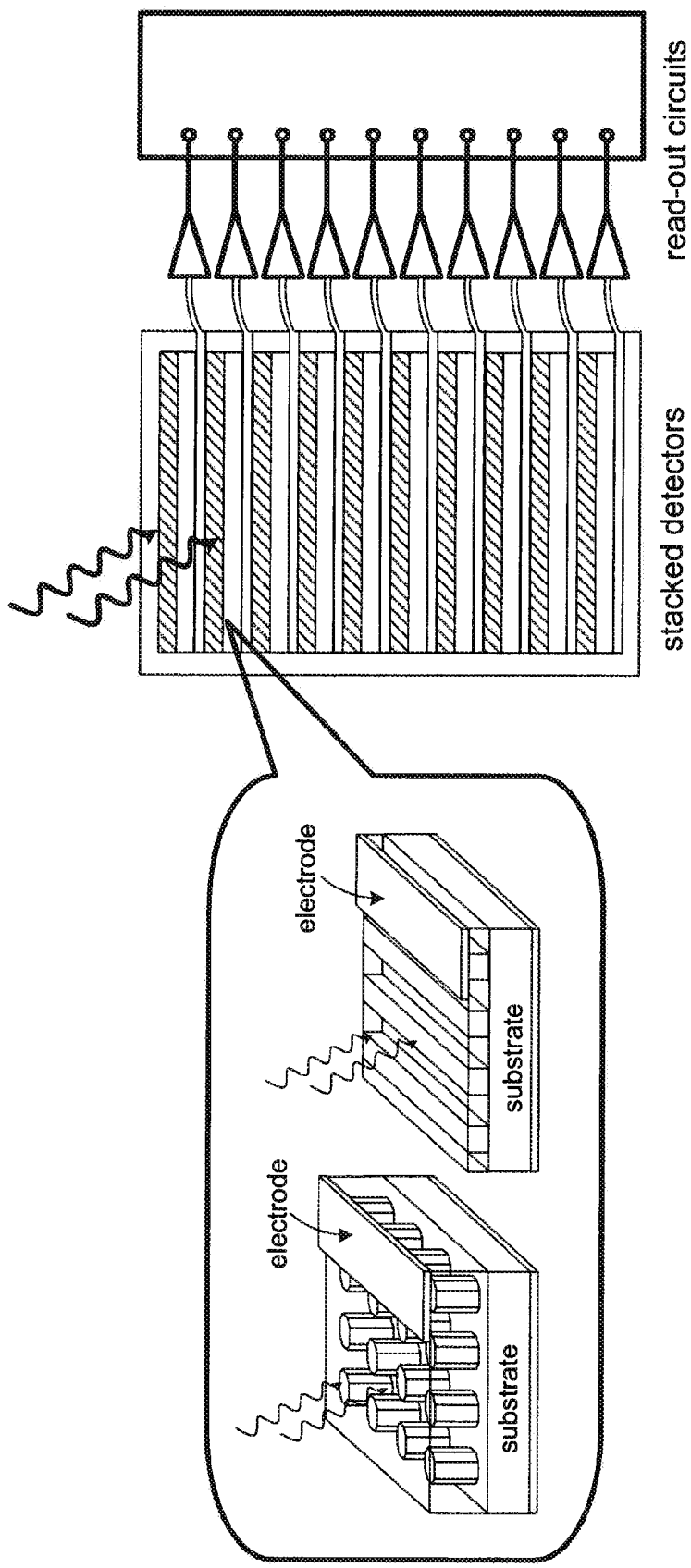
FIG. 3 shows schematics of a stacked neutron detector in accordance with an embodiment of the present invention.

FIG. 3 shows schematics of a stacked detector in accordance with an embodiment of the present invention wherein the neutron absorption material takes the form of multilayered nanostructured arrays. Each layer is a structure grown by nano-heteroepitaxy, such as described above. The signal from each array layer can be read out independently using a charge sensitive amplifier. In addition to the benefit of improving charge collection, thus achieving good energy resolution without complex shaped electrodes, stacking more detector layers enables achievement of an effective volume for high efficiency radiation detection. Such a stacked detector can also be constructed using a neutron detection architecture having an unstructured layer of a suitable solid-state neutron absorption material, as described herein.

Alternate Array Fabrication Techniques

Standard lithography technology can be utilized to fabricate the micro- or nano-structures, as described above. Without the use of catalysts, the micro/nanostructures are defined lithographically. In some embodiments, stamp imprinting techniques may be used.

Figure 4:
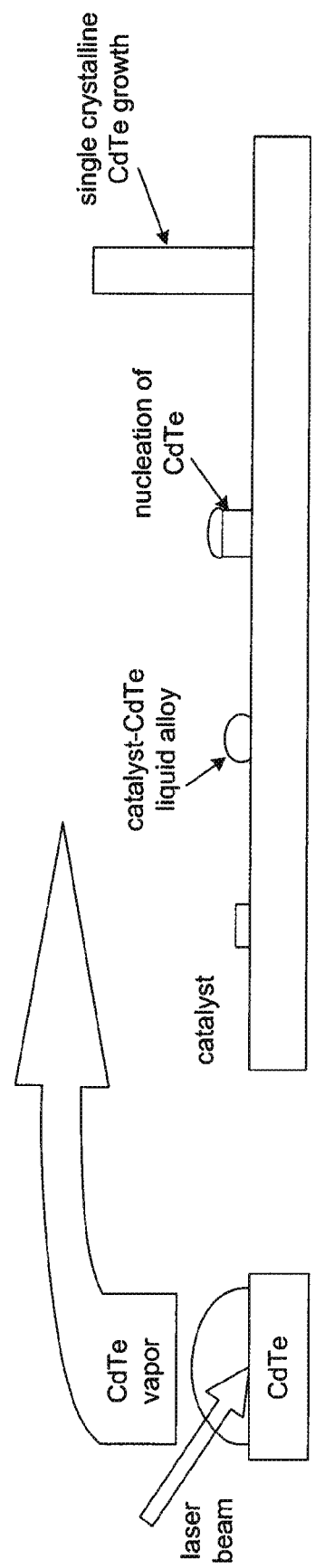
FIG. 4 illustrates a basic fabrication principle of catalyst-assisted laser nano-heteroepitaxy in accordance with aspects of the present invention, vapor-liquid-solid crystal growth mechanism.

Alternatively, catalyst-assisted laser nano-heteroepitaxy, for example, can synthesize single crystalline semiconductor heterostructures, in particular, CdTe on different substrates that can implemented into radiation detectors. Wide band-gap semiconductor material, such as ZnTe, ZnO, and GaN column/rod crystals doped with elements having large neutron interaction cross-sections (e.g., Gd, B) can be so fabricated. The basic fabrication principle of catalyst-assisted laser nano-heteroepitaxy is the so-called vapor-liquid-solid crystal growth mechanism, illustrated for a particular embodiment of FIG. 4. A metallic catalyst (e.g., Au) is applied to a substrate to promote high aspect-ratio directional single crystal growth. Three distinct growth stages are involved in the technique, which are alloying with catalyst, nucleation of crystallite, and growth of single crystals. The arrays or area locations of semiconductor nano-crystalline heterostructures can be defined by patterning metal catalysts on a substrate that are compatible with vertical integration with other physical layers of the radiation detector devices.

Detector

Fabrication of semiconductor radiation detectors implemented with unstructured layers and arrays of nanoscale crystalline heterostructures for neutron absorption, as described herein, is compatible with state-of-the-art semiconductor manufacturing processes. A single-layer radiation detector uses the bottom-up fabrication approach for forming a p-n type junction, such as a p-Si/n-ZnO diode. Alternatively, a Schottky type junction, such as an In—CdTe diode with In as the anode on p-type CdTe, is also an effective radiation detector structure.

In any of the implementations, incoming neutrons generate α-particles or γ-photons which interact with the semiconductor to generate electron and hole pairs. The electrons move through a circuit connecting the electrodes to fill the holes, thereby signaling neutron detection. The current generated is proportional to the neutrons detected. The detector is completed by electronic circuits for signal amplification and output.

CONCLUSION

Embodiments of the present invention provide room temperature operating solid state hand held neutron detectors.

Although the foregoing invention has been described in some detail for purposes of clarity of understanding, certain changes and modifications will be apparent to those of skill in the art. It should be noted that there are many alternative ways of implementing both the process and compositions of the present invention. Accordingly, the present embodiments are to be considered as illustrative and not restrictive, and the invention is not to be limited to the details given herein. The following sample claims are representative of aspects of the present invention but should not be considered to be exhaustive.

What is claimed:

1. A solid-state neutron detector architecture, comprising:
a layered structure, having the following layers interposed relative to one another as follows:
a first electrode;
a first semiconductor layer;
an array layer including one or more micro- or nano-structured arrays comprising a plurality of discrete features of a high neutron interaction cross-section material, the discrete features located on, and formed from a different material than, the first semiconductor layer;
a second semiconductor layer; and
a second electrode, wherein one of the first semiconductor layer and the second semiconductor layer is p-doped and the other of the first semiconductor layer and the second semiconductor layer is n-doped.

2. The architecture of claim 1, wherein the detector operates at room temperature.

3. The architecture of claim 1, wherein the detector is configurable as a portable hand held unit.

4. The architecture of claim 1, wherein the high neutron interaction cross-section element material is selected from the group consisting of Gd, B and Li.

5. The architecture of claim 1, wherein the high neutron interaction cross-section element material is selected from the group consisting of Gd and B.

6. The architecture of claim 1, wherein the high neutron interaction cross-section material is Gd.

7. The architecture of claim 1, wherein the high neutron interaction cross-section material of the discrete features selected from the group consisting of Gd, B or Li, alloys thereof, semiconductors doped with Gd, B or Li or organic compounds incorporating Gd, B or Li.

8. The architecture of claim 1, wherein the array layer has a thickness that is on the order of the length scale imposed by the average range of neutron interaction.

9. The architecture of claim 1, wherein at least one of the first semiconductor layer and the second semiconductor layer has a thickness that is on the order of the length scale imposed by the product of the semiconductor material's mobility-lifetime-field.

10. The architecture of claim 1, wherein the array layer has a thickness of about 50 nm to 10 μm.

11. The architecture of claim 1, further comprising one or more additional array layers including one or more additional micro- or nano-structured arrays comprising a plurality of additional discrete features of the high neutron interaction cross-section material, the discrete features formed from a different material than the first semiconductor layer.

12. The architecture of claim 11, wherein each of the one or more additional array layers is included in a corresponding additional layered structure corresponding to the layered structure of claim 1.

13. The architecture of claim 1, wherein the array layer includes only a single array.

14. A neutron detector, comprising:
a solid-state architecture in accordance with claim 1;
a circuit connecting the first electrode and the second electrode; and
electronic circuits for signal amplification and output.

15. A method of making a solid-state neutron detector architecture, comprising assembling:
a layered structure, having the following layers interposed relative to one another as follows:
a first electrode;
a first semiconductor layer;
an array layer including one or more micro- or nano-structured arrays comprising a plurality of discrete features of a high neutron interaction cross-section material, the discrete features located on, and formed from a different material than, the first semiconductor layer;
a second semiconductor layer; and
a second electrode, wherein one of the first semiconductor layer and the second semiconductor layer is p-doped and the other of the first semiconductor layer and the second semiconductor layer is n-doped.

16. The method of claim 15, further comprising assembling with the solid-state neutron detector architecture:
a circuit connecting the electrodes; and
electronic circuits for signal amplification and output.

17. The method of claim 15, further comprising:
forming an array of seed islands on the first semiconductor layer; and
growing crystals of the high neutron interaction cross-section material from the seed islands using heteroepitaxy to form the discrete features.

18. The method of claim 15, further comprising:
forming the array of seed islands on the first semiconductor layer by growing the seed islands on the first semiconductor layer using a patterned growing technique.

19. The method of claim 15, further comprising:
forming the array of seed islands on the first semiconductor layer by:
growing an un-patterned layer of seed island material on the first semiconductor layer; and
patterning the un-patterned layer of seed island material using a lithography.

20. The solid-state neutron detector architecture of claim 1, wherein the first semiconductor layer has a substantially planar surface and the discrete features are located on the substantially planar surface and protrude from the substantially planar surface.

* * * * *